July 31, 1928.  1,678,861

F. KALKNER

SEARCHLIGHT

Filed Feb. 5, 1927

WITNESSES:

INVENTOR
Friedrich Kalkner
BY
ATTORNEY

Patented July 31, 1928.

1,678,861

UNITED STATES PATENT OFFICE.

FRIEDRICH KALKNER, OF MOGELDORF, NEAR NUREMBERG, GERMANY, ASSIGNOR TO WESTINGHOUSE ELECTRIC & MANUFACTURING COMPANY, A CORPORATION OF PENNSYLVANIA.

SEARCHLIGHT.

Application filed February 5, 1927, Serial No. 166,129, and in Germany February 6, 1926.

My invention relates to searchlights and more particularly to lens-changing mechanisms for alternately positioning either of two lenses or distributors in front of projectors.

It is sometimes desirable to distribute the light from a projector over a wide path and, at other times, over a narrow path. My invention utilizes two sets of lenses for securing this result. One set of lenses is so designed as to secure a wide dispersion of the light, while the other, comprising a set of prisms positioned in a different way, directs the light from the projector into a narrow beam.

An object of my invention is to provide, in connection with a projector, a double set of lenses which may be alternately positioned in front of the projector.

Another object of my invention is to provide means for balancing the weight of one set of lenses against the weight of the other.

Another object of my invention is to provide a lens-changing mechanism which does not materially increase the surface of the searchlight exposed to the wind.

A further object of my invention is to provide a lens-changing mechanism which is simple and sturdy in construction and low in cost of manufacture.

My invention may be better understood by reference to the accompanying drawings in which like numbers denote like parts:

Figure 1:
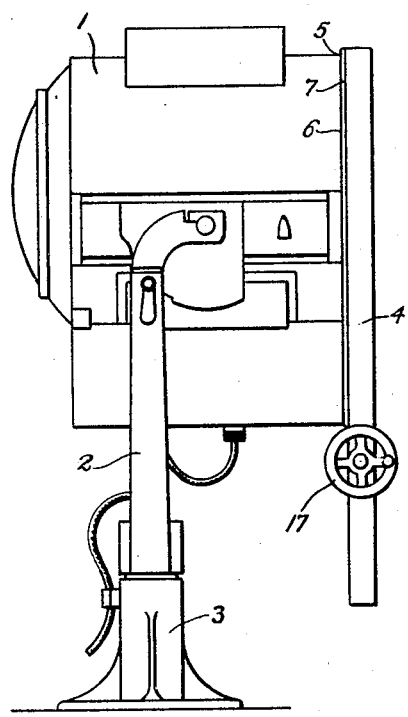
Figure 1 is a view, in side elevation, of a projector utilizing my invention.

Referring to Fig. 1, a projector 1 of a conventional type is mounted on a standard 2, which is rotatably mounted on a base 3 in any manner well known to the art. My device is enclosed in a housing 4 which is provided with a rear wall 5 fastened to the front portion 6 of the projector. An opening 7 in the rear wall of the housing 4 is adapted to coincide with the light aperture of the projector.

Figure 2:
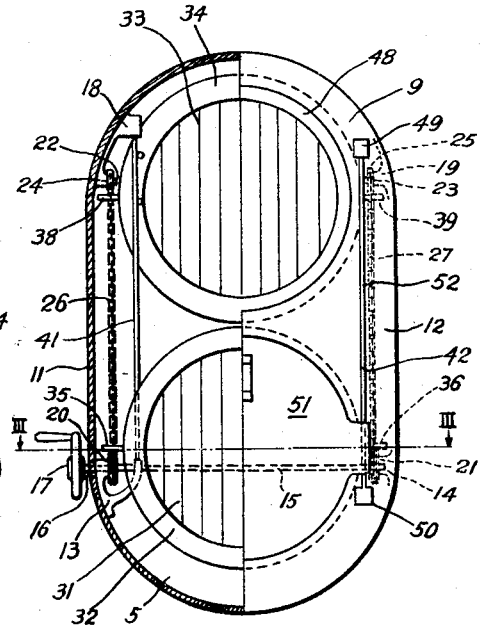
Fig. 2 is a front view of my device, partially in elevation and partially in section, the cover being broken away as indicated on the left-hand portion of the drawing.

Referring to Fig. 2, the housing 4 comprises an oval-shape rim 11, the rear wall 5 and a housing cover 12. Upon the inner edge of the lower portion of the housing 4 are positioned two brackets 13 and 14, in which a shaft 15 is adapted to be rotatably mounted to extend through an opening 16 in the side of the housing.

A hand-wheel 17 is fastened to the outer end of the shaft 15, and two sprocket-wheels 20 and 21 are keyed to the shaft 15 inside of the housing. Two brackets 18 and 19 are mounted in the upper portion of the housing, and stub shafts 22 and 23, supporting sprockets 24 and 25, are rotatably mounted on the brackets 18 and 19. Two endless chains 26 and 27 are mounted on the opposite sprockets 20 and 24, 21 and 25.

Diverging lens 31 (Fig. 3) is mounted in a lower lens frame 32, and a converging lens 33 is mounted in an upper lens frame 34. Stub shafts 35 and 36, on opposite edges of the lens frame 32, are adapted to engage the endless chains 26 and 27 to support the lens 31. In a similar manner, stub shafts 38 and 39 in lens frame 34 are associated with the endless chains to support the lens 33. Brackets 13 and 18 are adapted to support a guide rod 41, and brackets 14 and 19 support a guide rod 42.

Figure 3:
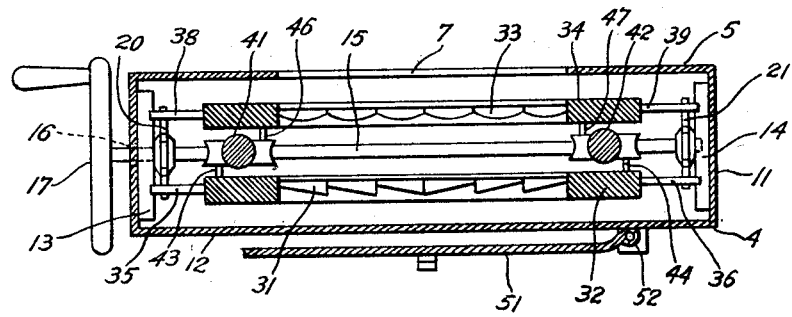
Fig. 3 is a top cross-sectional view of my device, taken along the line III—III of Fig. 2.

Referring to Fig. 3, the lens 31 is guided by means of guide rod 41. Laterally extending stub shafts 43 and 44 in the lens frame 32 are provided with rollers to bear against the guides 41 and 42, and similar stub shafts 46 and 47 have rollers bearing against the reverse side of the guides 41 and 42. In this way, the lenses are held in a vertical position. Coinciding with the light aperture in the projector, is an opening 48 in the front housing cover 12 to permit the beam of light to be projected through the casing.

At times, it is necessary for the beam to be intercepted or extinguished without turning out the lamp. This is accomplished by means of a cover 51 that is slidably mounted on a rod 52. The rod 52 is mounted on the front cover 12 by means of lugs 49, and 50 and it extends above the upper and below the lower horizontal center lines of the lenses when they are in their extreme positions. When inoperative, the cover is disposed on rod 52 so that it will be in front of the opening in the lower portion of the housing 7, but, when it is desirable to interrupt the light, the cover is moved upwardly along the rod 52 until it is disposed in front of the opening 48.

In operation, if a wide differential beam is desired, the hand-wheel 17 is revolved in a clockwise direction until the diverging lens 31 is located in front of the projector. If a narrow beam is desired, the hand-wheel is rotated in a counter-clockwise direction until the converging lens 33 is located in front of the projector. The lenses are so mounted on different portions of the chains that the weight of one will counter-balance the weight of the other, and thus less effort is required to move them into and out of their operative positions. By mounting the lenses on opposite sides of the chains, they will be so located with respect to each other as to constitute a mutual counter-balance.

The two lenses or distributors are thus arranged to move in a plane perpendicular to the optical axis of the searchlight.

The housing for the distributors may advantageously be arranged so that it will occupy the space directly in front of the base, standard and projector. With such an arrangement of the distributor casing, the surface of the device that is exposed to the wind will be increased but little, if any, and the destructive effect of the wind, particularly where searchlights are located in exposed places, will be avoided.

Although one embodiment of my invention has been described, other modifications may be made in my lens-changing mechanism. For example, the two lenses may each be mounted on a gear rack, the shaft, hand-wheel and sprockets may be centrally located in the housing and the sprockets thereof, co-acting against the gear racks, may be arranged to move the lenses into operative positions. Such modifications of my device may be made without departing from the spirit and scope of the invention as defined in the appended claims.

I claim as my invention:

1. The combination with a projector having a light aperture therein, of means for alternately locating a plurality of lenses in front of said light aperture, the lens-locating means being adapted to move the lenses in parallel planes in opposite directions at the same time.

2. A projector provided with a plurality of lenses and means for alternately positioning the lenses in front of the projector, the lens-positioning means being adapted to simultaneously move the lenses in parallel planes in opposite directions.

3. In a projector provided with a plurality of lenses, interlocking means for alternately moving said lenses in parallel planes in front of, the light aperture in the projector, and a housing adapted to form a closure about the lenses and the lens-moving means.

4. In combination with a projector having a light aperture therein, an apertured lens housing mounted on said projector, said housing comprising a frame, a shaft in one portion of said frame provided with coacting geared driving members, driven members mounted in said frame for cooperating with said driving members, and a plurality of lenses mounted on said driven members for simultaneous movement of the lenses in parallel planes by the driving members in opposite directions in a direction at right angles to the rays of light from said projector.

5. In combination with a projector having a light aperture therein, an apertured lens housing mounted on said projector comprising a frame, a shaft in one portion of said frame having a sprocket wheel mounted thereon, a sprocket-wheel mounted in another portion of said frame, a chain for operatively connecting said sprocket-wheels, and means for mounting lenses on said chains, whereby said lenses may be simultaneously moved alternately in front of and away from said light aperture when said sprocket-wheels are actuated.

In testimony whereof, I have hereunto subscribed my name this 21st day of January, 1927.

FRIEDRICH KALKNER.